Nov. 23, 1926.
C. W. FIEGE
1,608,263
DEHYDRATOR
Filed Jan. 19, 1926
2 Sheets-Sheet 1
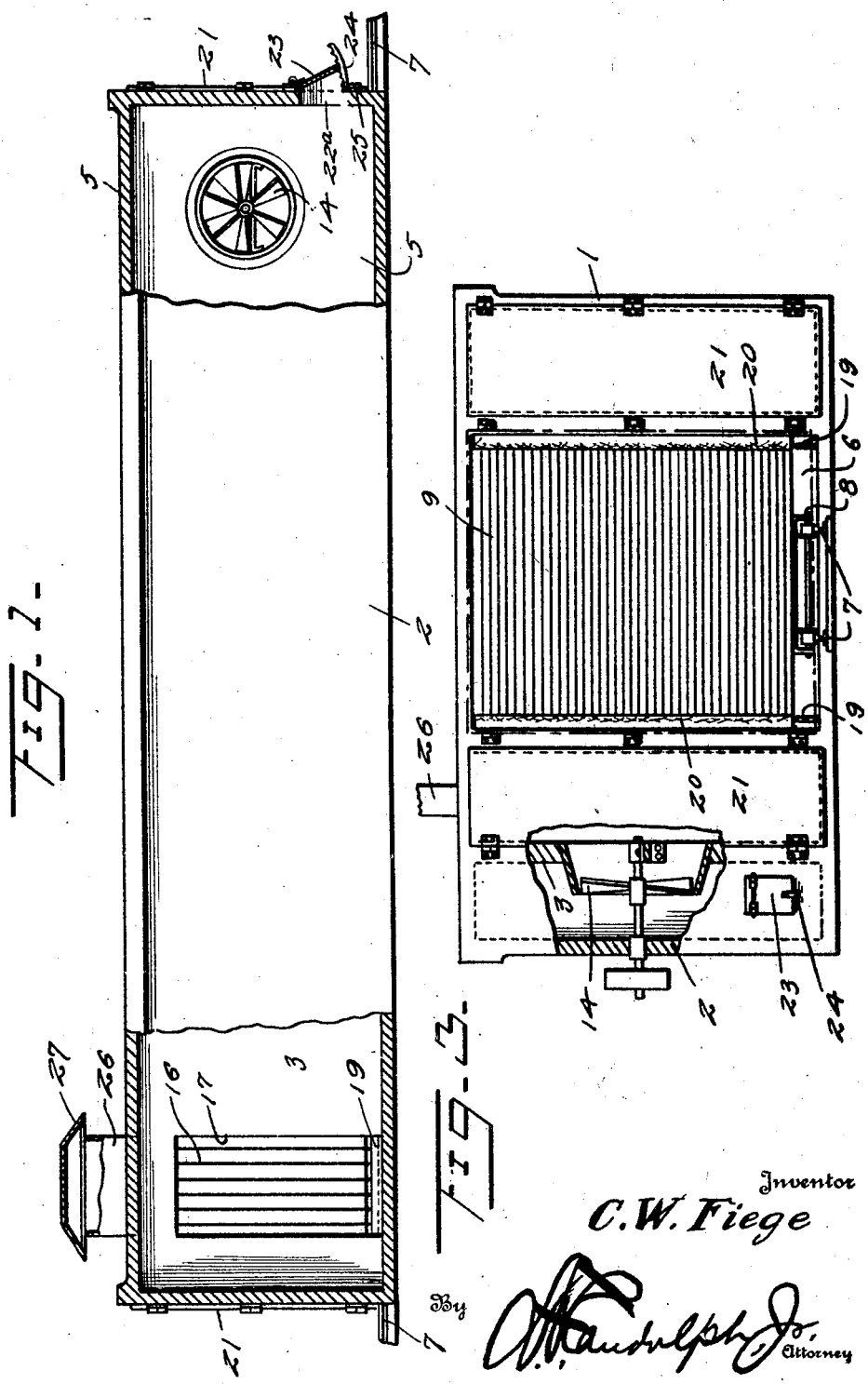
Inventor
C. W. Fiege
By
Attorney Nov. 23, 1926.  
C. W. FIEGE  
DEHYDRATOR  
Filed Jan. 19, 1926  
1,608,263  
2 Sheets-Sheet 2
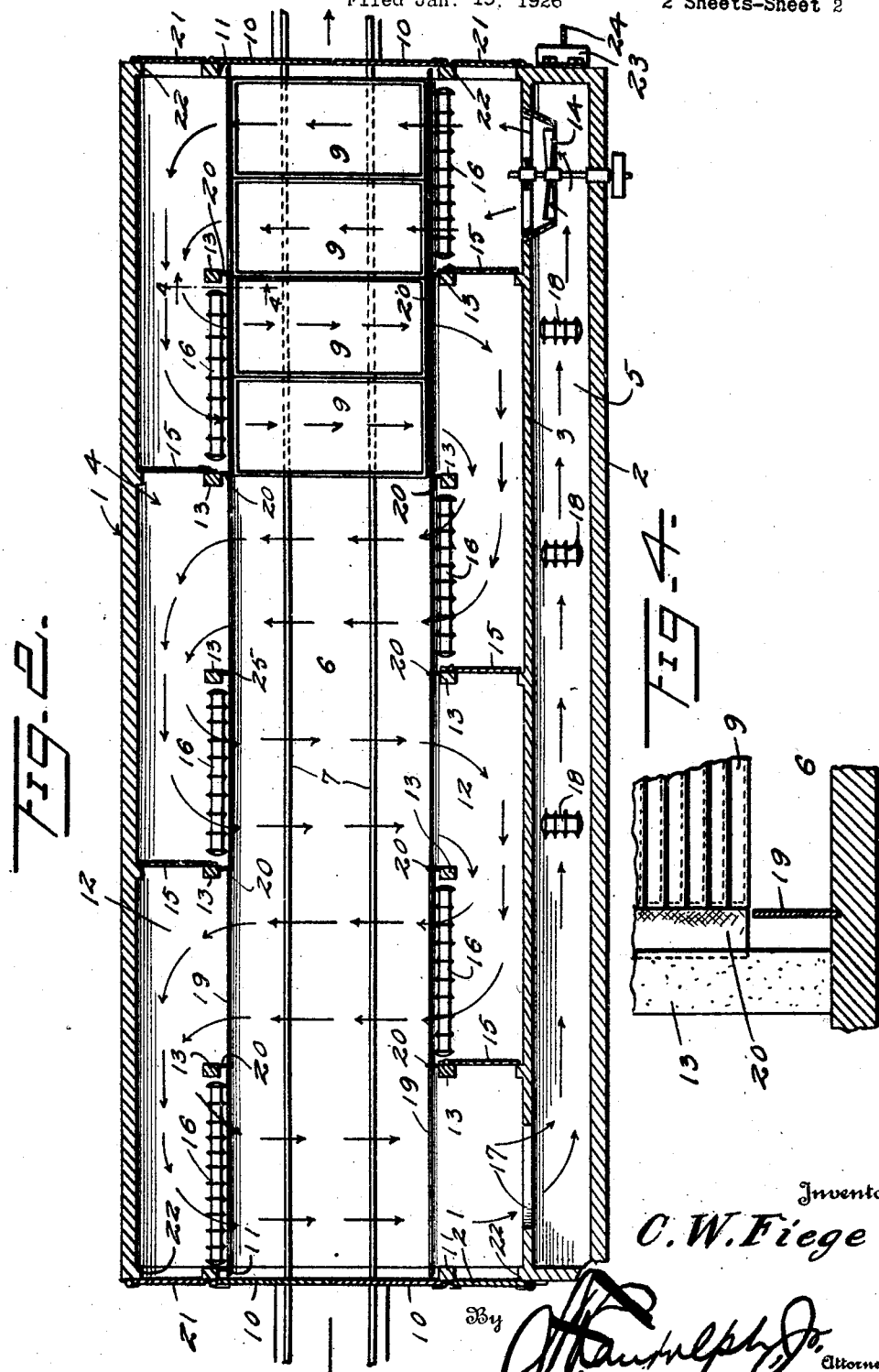

Patented Nov. 23, 1926.

1,608,263

UNITED STATES PATENT OFFICE.

CARL W. FIEGE, OF HEALDSBURG, CALIFORNIA.

DEHYDRATOR.

Application filed January 19, 1926. Serial No. 82,261.

The invention relates to apparatus for drying material such for instance as lumber, bricks, or the like, of the type shown and described in my Patent No. 1,543,073, of June 23, 1925, and has for its principal object the provision of a simplified structure of apparatus to the end that the expense of installation of the apparatus may be reduced and be particularly adapted for small plants.

In my patent above referred to a side entrance is provided with a transfer truck to enable removing truck loads of material when it is desired to do so during the drying operation without disturbing the remainder of the material being treated, and the return duct for moisture laden air is through an underground passage. In the structure of the device that is the subject matter of this application the side entrance and transfer truck have been omitted, and the moisture laden air return duct is arranged on the same horizontal plane as the drying room, and means is also provided in the duct for treating the air while passing therethrough, in addition to providing heating means in the drying room, said heating means in the drying room being arranged throughout the length of the room and also so arranged that the air is heated preliminary to passing through material throughout the length of the room.

The invention will be described in detail hereinafter and will be found illustrated in the accompanying drawings, in which Figure 1 is a side view partly in section, of the improved dehydrator, Figure 2 is a horizontal sectional view, Figure 3 is an end view partly in section and showing the end doors to the middle space open, and Figure 4 a detail sectional view on an enlarged scale on a plane indicated by the line 4—4 of Figure 2.

In the drawings similar reference characters will be used to designate corresponding parts throughout the several views.

The improved dehydrator comprises an enclosure having side walls 1 and 2 and a partition wall 3 dividing the enclosure into a drying space 4 and a return duct 5. The drying space 4 has a longitudinal middle space 6 on the floor of which is arranged a track 7 over which trucks 8 carrying the material to be dried are moved, said trucks in the drawings being shown supporting trays 9 on which material to be treated is supported.

As shown in the drawings, the track 7 extends outside of the closure at both ends thereof and the end walls of the enclosure are provided with swinging doors 10 closing openings 11 in said end walls through which the trucks 8 are moved into and out of the enclosure.

At each side of the middle space 6 is arranged a passageway 12, and 13 are a series of columns on each side of the middle space 6. A fan blower 14 is arranged in the partition wall 3 adjacent to one end of the enclosure, and arranged to drive air transversely of the chamber 4, 15 indicating doors hingedly mounted on the columns 13 and serving as baffles to direct the air entering the chamber 4 from the fan blower 14 in a zigzag course back and forth across said chamber as indicated by the arrows. Heating members 16, that may be of any suitable type, and may be arranged to be separately controlled, are arranged between alternate pairs of columns 13 on the two sides of the middle space 6, as clearly shown in Figure 2, this arrangement providing for heating the air preliminary to passage across the middle space 6 to the material on the trucks 8. An opening 17 is provided in the partition wall 3 adjacent the end farthest removed from the fan blower 14 and is designed to convey the air from the chamber 4 through the duct 5 back to the blower 14, 18 indicating heating members arranged in the duct 5 to heat the air while passing through said duct and preliminary to being returned to the chamber 4 by means of the blower 14.

A sealing strip 19 rises from the floor of the chamber 4 at each side of the middle space 6, and other sealing strips 20 are arranged on the columns 13, said sealing strips 19 and 20 being designed to direct the air through the trays 9 on the trucks 8.

Entrance to the passageways 12 is secured by means of doors 21 closing openings 22 in the end walls. The end wall of the duct 5 adjacent to the blower 14 is provided with a draft opening 22$^a$ controlled by a hinged valve 23 to admit air from the exterior of the enclosure as desired, 24 indicating a notched rod hingedly secured to the valve 23 and adapted to engage a stop 25 secured to said wall. 26 is an outlet for the air arranged in the roof of the enclosure and covered by a hood 27, said outlet 26 being arranged adjacent the partition wall 3 at the end of the chamber 4 remote from the blower 14.

What is claimed is:—

1. In a dehydrator, an elongated enclosure provided with a middle longitudinal space for the material to be treated and having a passageway on each side of said space, a series of columns between each passageway and the middle space, doors hingedly mounted on alternate columns of each series, the doors on the two sides of the middle space being in staggered relation, heating means mounted between alternate pairs of columns, said heating means being in staggered relation on the two sides of the middle space, and means to force the air through said enclosure.

2. A dehydrator comprising an elongated enclosure having a middle longitudinal space for the material to be treated and a passageway on each side of said space, a series of columns between each passageway and the middle space, doors hingedly mounted on alternate columns of each series, the doors on the two sides of the middle space being in staggered relation, heating means mounted between alternate pairs of columns, said heating means being in staggered relation on the two sides of the middle space, a duct at one side of the enclosure and separated therefrom by a partition wall, air driving means arranged in said wall at one end thereof, the wall at the end remote from the air driving means provided with an opening connecting the enclosure and duct, and heating means arranged in said duct intermediate said opening and air driving means.

In testimony whereof I affix my signature.

CARL W. FIEGE.